United States Patent
Torres et al.

(10) Patent No.: US 9,593,682 B2
(45) Date of Patent: Mar. 14, 2017

(54) HYDRODYNAMIC BEARING APPLIED ON A CONTACT INTERFACE OF A FLUID COMPRESSOR BASED ON A SPIRAL TYPE MECHANISM

(71) Applicant: Whirlpool S.A., São Paulo (BR)

(72) Inventors: Fernando Withers Torres, Joinville (BR); José Daniel Biasoli de Mello, Uberlândia (BR)

(73) Assignee: WHIRLPOOL S.A., São Paulo (BR)

( * ) Notice: Subject to any disclaimer, the term of this patent is extended or adjusted under 35 U.S.C. 154(b) by 0 days.

(21) Appl. No.: 14/426,249

(22) PCT Filed: Aug. 22, 2013

(86) PCT No.: PCT/BR2013/000321
§ 371 (c)(1),
(2) Date: Mar. 5, 2015

(87) PCT Pub. No.: WO2014/040153
PCT Pub. Date: Mar. 20, 2014

(65) Prior Publication Data
US 2015/0300354 A1    Oct. 22, 2015

(30) Foreign Application Priority Data

Sep. 6, 2012    (BR) .......................... 1020120226901

(51) Int. Cl.
*F04C 29/02*    (2006.01)
*F04C 18/02*    (2006.01)
(Continued)

(52) U.S. Cl.
CPC ...... *F04C 29/0092* (2013.01); *F04C 18/0223* (2013.01); *F04C 29/02* (2013.01);
(Continued)

(58) Field of Classification Search
CPC .. F04C 18/0223; F04C 29/0092; F04C 29/02; F16C 17/045; F16C 33/107; F16C 2240/42; F16C 2240/44
(Continued)

(56) References Cited

U.S. PATENT DOCUMENTS

| 801,182 A | 10/1905 | Creux |
| 5,810,479 A * | 9/1998 | Miyasaka ............. F16C 17/026 384/107 |

(Continued)

FOREIGN PATENT DOCUMENTS

| EP | 1 207 314 | 5/2002 |
| JP | H08 35495 | 2/1996 |
| JP | 2002-213374 | 7/2002 |

OTHER PUBLICATIONS

International Search Report for International Application No. PCT/BR2013/000321, mailed on Nov. 15, 2013.

*Primary Examiner* — Nicholas J Weiss
*Assistant Examiner* — Dapinder Singh
(74) *Attorney, Agent, or Firm* — Andrews Kurth Kenyon LLP

(57) ABSTRACT

The present disclosure refers to a partial texturization applied on a contact interface of a scroll fluid compressor. The scroll fluid compressor may have an orbiting whorl, a non-orbiting whorl, and a block frame which holds the orbiting whorl in contact with the non-orbiting whorl. The partial texturization can be applied on the lower surface of the orbiting whorl, the upper surface of the block frame, or both, and can include at least two first regions separated by second regions. The first regions have surfaces including a plurality of micro-cavities and the second regions have substantially smooth surfaces.

10 Claims, 1 Drawing Sheet

(51) Int. Cl.
*F16C 33/10* (2006.01)
*F04C 29/00* (2006.01)
*F16C 17/04* (2006.01)

(52) U.S. Cl.
CPC .......... *F16C 17/045* (2013.01); *F16C 33/107* (2013.01); *F16C 2240/42* (2013.01); *F16C 2240/44* (2013.01)

(58) Field of Classification Search
USPC .................. 418/55.1–55.6, 63; 384/100, 107
See application file for complete search history.

(56) References Cited

U.S. PATENT DOCUMENTS

| | | | | |
|---|---|---|---|---|
| 6,250,807 | B1 * | 6/2001 | Mori | F16C 17/026 |
| | | | | 384/100 |
| 6,307,293 | B1 * | 10/2001 | Ichiyama | F16C 17/107 |
| | | | | 310/90.5 |
| 6,537,045 | B2 * | 3/2003 | Riegger | F01C 21/02 |
| | | | | 184/6.16 |
| 6,793,394 | B2 * | 9/2004 | Gomyo | F16C 17/04 |
| | | | | 384/100 |
| 7,329,109 | B2 | 2/2008 | Lifson | |
| 7,422,423 | B2 | 9/2008 | Kawabata et al. | |

\* cited by examiner

HYDRODYNAMIC BEARING APPLIED ON A CONTACT INTERFACE OF A FLUID COMPRESSOR BASED ON A SPIRAL TYPE MECHANISM

CROSS-REFERENCE TO RELATED APPLICATIONS

The present application is a U.S. National Phase of International Patent Application No. PCT/BR2013/000321, filed on Aug. 22, 2013, and claims priority to Brazilian Patent Application No. BR 10 2012 022690 1, filed on Sep. 6, 2012, each, including all disclosures and specifications, are hereby expressly incorporated herein in their entirety by reference thereto.

FIELD OF THE INVENTION

This invention refers to a block frame for a scroll fluid compressor and, more particularly, a partially texturizated block frame.

BACKGROUND

Scroll fluid compressors include fluid compression devices which were designed based on a conceptual technology that was described in 1905 in U.S. Pat. No. 801,182. According to this document, a scroll fluid compressor includes two similar structures named whorls, each of which being a circular plate with a perpendicular wall that has a fundamentally spiral outline. These whorls are inversely coupled together so that the top of the perpendicular wall of the first whorl is in contact with the base of the second whorl, forming a reciprocal coupling. Moreover, in addition to be connected to the other whorl, one of the whorls is attached to an electric motor. The whorl attached to the electric motor is called the orbiting whorl and the other whorl is called the fixed whorl.

According to U.S. Pat. No. 801,182, an element is provided which is capable of providing the orbiting whorl with an orbital movement from the rotational movement of the shaft of the electric motor. The orbital movement of the orbiting whorl, in relation to the fixed whorl, results in a continuous and gradual movement of the points of contact between the orbiting whorl and the fixed whorl. This continuous and gradual alteration between these points of contact produces continuously decreasing chambers. Because these virtual chambers can be filled with various fluids, by feeding the fluids into the chambers, one can compress the fluids.

Generally, the whorls and the electric motor are placed in the same housing (normally a hermetic housing), and, therefore, it is common to secure one whorl against the other whorl through a rigid structure, which is known as a block frame. Accordingly, a conventional scroll fluid compressor has multiple contact interfaces between the moving parts and the fixed parts. Among these contact interfaces, the following are noted: the contact interface between the shaft of the motor and the piping of the block frame, the contact interface between the tops and bases of the orbiting and fixed whorls, and the contact interface between the lower surface of the orbiting whorl and the upper surface of the block frame. Generally, these contact interfaces include "chambers" of lubricating fluids in between the contact interfaces to reduce the contact, and consequently, the friction between the elements.

In fluid compressors, especially scroll fluid compressors, it is common to store the lubricating fluid responsible for lubrication of all the contact interfaces in the interior of the hermetic housing of the compressor. The lubricating fluid is delivered to these contact interfaces by the shaft of the electric motor when the compressor is started up. Subsequently, the lubricating fluid returns back to the "bottom" of the hermetic housing (due to the force of gravity). In this regard, when the compressor starts up, the lower bearings are lubricated before the upper bearings. Thus, after startup of the compressor (i.e., after a few seconds), some of the contact interfaces that use the lubricating fluid enter into direct contact before being lubricated. These contact interfaces tend to be more worn out than other contact interfaces which are lubricated just after the compressor's startup. For example, it is noted that the contact interface between the lower surface of the orbiting whorl and the upper surface of the block frame tend to wear out quicker than the contact interface between the shaft of the motor and the piping of the block frame. This is because when the compressor starts up, the latter receives lubricating fluid before the former.

Delayed lubrication of parts is a significant problem in compressors and can disproportionately affect the useful lives of different parts in a compressor. For example, a compressor can be replaced (or submitted for repair) when some of its parts are still fully functional. Alternatively, the same compressor could be continually used when some of its parts are damaged.

Some have attempted to address these problems. For example, U.S. Pat. No. 7,329,109 describes a scroll fluid compressor in which the contact interface between the tops and bases of the orbiting and fixed whorls include at least one retention recess (to store oil). The retention recess is constructed in a manner to preserve a quantity of oil capable of providing lubrication between these components when the compressor is started up. Moreover, this retention recess, or "chamber," acts as a seal between the whorls.

As another example, Japanese Pat. App. No. 2002213374 describes a scroll fluid compressor in which the upper surface of the whorl provides a plurality of concavities that optimize the lubrication of the contact interface between the tops and bases of the orbiting and fixed whorls. Perceptibly, the objectives of this embodiment are similar to the objectives of the embodiment described in U.S. Pat. No. 7,329,109.

As another example, U.S. Pat. No. 6,537,045 describes a scroll fluid compressor in which the contact interface between the lower surface of the orbiting whorl and the upper surface of the block frame provides multiple recesses of micrometric depth (from 30 μm to 150 μm). These recesses are specially designed for lubrication optimization of the aforesaid contact interface. These recesses intend to act as pre-reservoirs of lubricating fluid and are supposedly capable of preserving a quantity of lubricating fluid sufficient for lubrication of the components when the compressor is started up.

In any event, the recesses described in U.S. Pat. No. 6,537,045 are too deep. These depths do not allow for creation of a field of pressure that is necessary to provide support for the load. This is because in a film of oil with the special viscosity for the scroll type compressors (ISO 10 to ISO 68), the "height" of the film of oil (in a hydrodynamic setting) is fundamentally defined by the maximum depth of the recesses. When this depth is excessive, the "height" of the film of oil produces a fundamentally null "support pressure," as described by the classic theory of lubrication.

U.S. Pat. No. 7,422,423 describes an alternative compressor used in refrigeration systems. This compressor provides for a plurality of "contact sections" between the moving parts. In particular, the "contact sections" are spherical shaped recesses, which are configured to cause a vortex flow of the oil retained therein. It is also noted that the aforementioned spherical recesses are shaped through grinding by a machine. Furthermore, the teaching described in U.S. Pat. No. 7,422,423 is especially efficient in lubrication of components making rotational or alternating movement. However, these embodiments do not apply to lubrication of components making orbital movement.

SUMMARY

Based on the above, it is evident that there is a need for development of a solution capable of optimizing lubrication of contact interfaces, where there is orbital movement between the elements, such as in a scroll compressor.

Accordingly, it is an objective of the present disclosure to provide for lubrication of contact interfaces of a scroll fluid compressor, and more specifically, the lower surface of the orbiting whorl and the upper surface of the block frame. It is another objective of the present disclosure to provide for lubrication of contact interfaces of a scroll fluid compressor, the lubrication producing the effect known as "Rayleigh step" using a partially texturized surface including micro-cavities. It is yet another objective of the present disclosure to provide for a device for lubrication of contact interfaces of a scroll fluid compressor which is capable of storing abrasive particles produced from the wear and tear of the internal components of the compressor during its operation. By removing the abrasive particles and preventing them from contacting the component surfaces, wear down of the components can be mitigated or prevented.

Accordingly, a scroll fluid compressor is described. The compressor comprises of a hermetic housing, an electric motor, a block frame, an orbiting whorl and a non-orbiting whorl. Also, the contact interface between the lower surface of the orbiting whorl and the upper surface of the block frame is partially texturized, i.e., comprises of at least two types of regions. One of the types of regions, the first region, has a surface which includes a plurality of micro-cavities (i.e., texturized). The other type of region, the second region, has substantially smooth surfaces (i.e., non-texturized). Moreover, each two adjacent first regions are separated by at least one second region.

These regions can be defined on the lower surface of the orbiting whorl or the upper surface of the block frame. These regions can also be defined on both the lower surface of the orbiting whorl and the upper surface of the block frame.

In this regard, the sum of the areas of the regions with micro-cavities (i.e., the first regions) corresponds to 30% to 80% of the area of the surface on which they are located (i.e., the lower surface of the orbiting whorl or the upper surface of the block frame, or both). The aforesaid micro-cavities are configured to store abrasive particles.

It is emphasized that the micro-cavities have original specifications. In this regard, each micro-cavity has a depth in the range of 1 µm to 30 µm, a surface area in the range of 5 µm$^2$ to 100 µm$^2$, and a border radius in the range of 0.01 µm to 30 µm. Furthermore, and preferentially, the micro-cavities are separated by a distance in the range of 1 µm to 100 µm.

It is also observed that the aforesaid micro-cavities comprise of a surface area that has a circular, elliptical or even rectangular profile. In this latter case, each micro-cavity with a surface area that has a rectangular profile comprises of micro-channels.

Optionally, at least one radial channel is located in at least one of the substantially smooth surface regions.

DETAILED DESCRIPTION

According to the classical theory of lubrication, it is known that the concept of "Rayleigh step" concerns the production of hydrodynamic pressure, or support pressure, in a lubrication fluid located between two moving bodies. In this regard, when there is a physical step between two surfaces in relative motion, and separated by a fluid with appropriate viscosity, a "maximum" occurs in the gradient of the hydrodynamic pressure, which contributes significantly to the efficiency of the lubrication.

It is observed that the "texturization" (conjoining of recesses) defined in the bearings exemplified in U.S. Pat. No. 6,537,045 and U.S. Pat. No. 7,422,423 do not produce the same effect. The spaces provided between the recesses are incapable of forming an actual physical step. It is in this regard that the present disclosure is provided. It discloses a partially texturized surface applied on a contact interface of a scroll fluid compressor. The contact interface can be between the block frame and the non-orbiting whorl of the scroll fluid compressor. The partial texturization of the contact interface creates a texturized region and a non-texturized region, which form a physical step (due to the difference in depths) that produces a "maximum" in the fluid pressure.

In an embodiment, only one of the surfaces of the contact interface between the block frame and the non-orbiting whorl of the scroll fluid compressor is partially texturized. However, in another embodiment, both of the surfaces can be partially texturized while maintaining the "maximum" in the fluid pressure.

Figure 1:
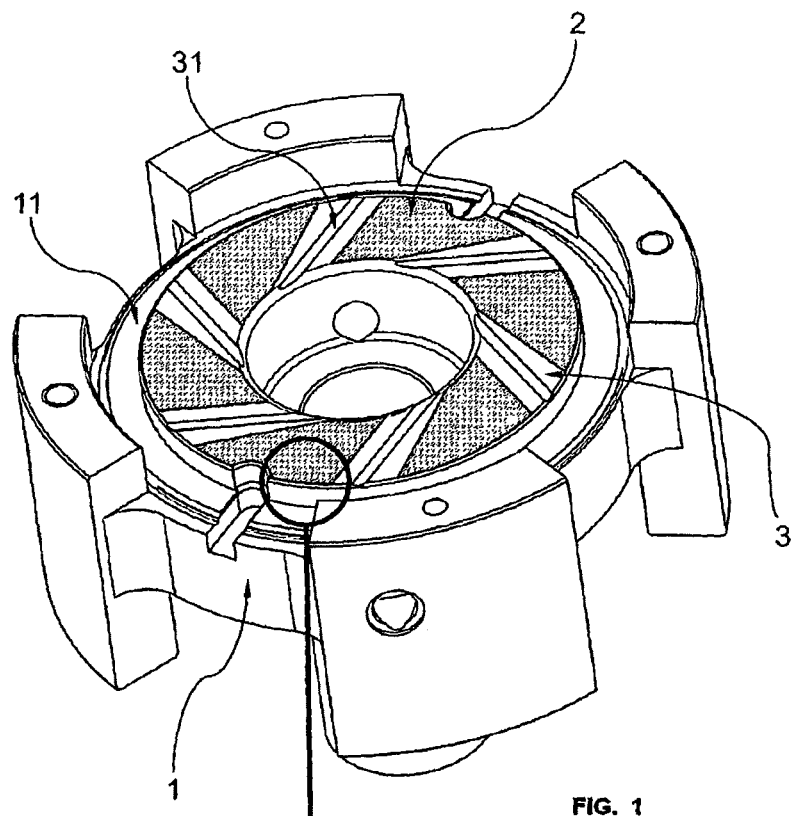
FIG. 1 illustrates a block frame of a scroll fluid compressor according to an example embodiment.

FIG. 1 illustrates an example embodiment of a block frame of a scroll fluid compressor in which the surface of the block frame is partially texturized. The block frame 1 of the scroll fluid compressor provides on its upper surface 11 six texturized regions 2 (i.e., first regions) and six regions 3 (i.e., second regions) with substantially smooth surfaces. However, it is noted that this embodiment is only an illustrative embodiment. Other embodiments can have more or fewer regions.

The sum of the areas of the regions 2 corresponds to 30% to 80% of the area of the upper surface 11 of the block frame 1.

Figure 2:
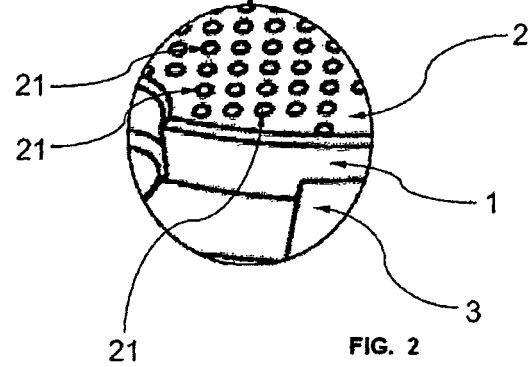
FIG. 2 illustrates an amplified view of micro-cavities in an example embodiment.

As illustrated in FIG. 2, each one of the regions 2 provides a texturization defined by a plurality of micro-cavities 21 on its upper surface 11. Each micro-cavity 21 can have certain dimensional characteristics that are capable of optimizing the creation and maintenance of a lubricating film from the lubricating oil normally used in the lubrication of the bearings of the scroll fluid compressors. Thus, the aforesaid micro-cavities 21 act as a type of storage pocket of lubricating oil. Moreover, the micro-cavities 21 can act as storage for deposits of abrasive particles that are produced from the direct contact between the metallic parts of the scroll fluid compressor.

Accordingly, each micro-cavity 21 has a depth in the range of 1 μm to 30 μm, a surface area in the range of 5 μm² to 100 μm², and a border radius in the range of 0.01 μm to 30 μm. It is emphasized that the border radius can determine the step in the pressure field. The larger the border radius, the less will be the difference of pressure in the aforesaid produced pressure field. Furthermore, the micro-cavities 21 are spaced apart by a distance in the range of 1 μm to 100 μm. This distance can help with maintaining the lubricating film stable.

It is also observed that, the micro-cavities 21 can comprise of a surface area that has a circular profile. Optionally, each micro-cavity 21 can comprise of a surface area that has an elliptical profile, although this embodiment is not illustrated. Also optionally, each micro-cavity 21 can comprise of a surface area that has a rectangular profile, thereby making a micro-channel. The micro-channel, in addition to optimizing the creation and maintenance of a lubricating film, acts as a storage for deposits of abrasive particles.

It is noted that the regions 2, in the manner in which they are inserted between regions 3, unify the individual mechanism of each micro-cavity 21, collectively produce an equivalent convergent effect between the surfaces. This effect substantially increases the capacity of the load of the lubricating film. Moreover, the height difference between the surfaces 2 and 3 creates a significant pressure field.

Independent of the format and location (on the upper surface of the block frame, on the lower surface of the non-orbiting whorl, or both) of the micro-cavities 21, the micro-cavities 21 can be engraved using various already known industrial processes. For example, the aforesaid micro-cavities 21 can be made through grinding using a laser. In this case, the micro-cavities 21 can be shaped into almost exact dimensions.

Optionally, the micro-cavities 21 can also be engraved through grinding using an electrolytic machine, by electrochemical corrosion without masking, or by other processes that are capable of altering the roughness of metallic surfaces.

In the present disclosure, example embodiments have been described. It should be understood that the scope of the present disclosure includes other possible variations, which are limited only by the content of the claims, including possible equivalent means.

The invention claimed is:

1. A fluid compressor comprising:
    a hermetic housing;
    an electric motor;
    a block frame;
    an orbiting whorl; and
    a non-orbiting whorl;
    wherein:
        a lower surface of the orbiting whorl is in contact with an upper surface of the block frame;
        at least one of the lower surface of the orbiting whorl and the upper surface of the block frame has a plurality of first regions and a plurality of second regions, and each two adjacent first regions are separated by at least one of the plurality of second regions;
        at least one of the plurality of the first regions includes a plurality of micro-cavities;
        at least one of the plurality of second regions has a smooth surface;
        each of the plurality of micro-cavities:
            has a depth in the range of 1 μm to 30 μm;
            has a surface area in the range of 5 μm² to 100 μm²;
            has a border radius in the range of 0.01 μm to 30 μm; and
            is separated from an adjacent micro-cavity by a distance in the range of 1 μm to 100 μm.

2. The fluid compressor of claim 1, wherein a surface area of each of the plurality of micro-cavities forms a circular profile.

3. The fluid compressor of claim 1, wherein a surface area of each of the plurality of micro-cavities forms an elliptical profile.

4. The fluid compressor of claim 1, wherein a surface area of each of the plurality of micro-cavities forms a rectangular profile.

5. The fluid compressor of claim 1, wherein the plurality of first regions and the plurality of second regions are defined on the lower surface of the orbiting whorl.

6. The fluid compressor of claim 1, wherein the plurality of first regions and the plurality of second regions are defined on the upper surface of the block frame.

7. The fluid compressor of claim 1, wherein the plurality of first regions and the plurality of second regions are defined on the lower surface of the orbiting whorl and the upper surface of the block frame.

8. The fluid compressor of claim 1, wherein the sum of the surface area of the plurality of first regions constitutes a range between 30% to 80% of the surface area of at least one of the lower surface of the orbiting whorl and the upper surface of the block frame.

9. The fluid compressor of claim 1, wherein at least one radial channel is located in at least one of the plurality of second regions.

10. The fluid compressor of claim 1, wherein the plurality of micro-cavities are configured to store deposits of abrasive particles.

* * * * *